(12) United States Patent
Taya et al.

(10) Patent No.: US 10,145,481 B2
(45) Date of Patent: Dec. 4, 2018

(54) PNEUMATIC VALVE

(71) Applicant: IHI Corporation, Koto-ku (JP)

(72) Inventors: Kohei Taya, Tokyo (JP); Hatsuo Mori, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/367,353

(22) Filed: Dec. 2, 2016

(65) Prior Publication Data
US 2017/0097103 A1 Apr. 6, 2017

Related U.S. Application Data

(63) Continuation of application No. PCT/JP2015/069020, filed on Jul. 1, 2015.

(30) Foreign Application Priority Data

Oct. 2, 2014 (JP) .................................. 2014-203873

(51) Int. Cl.
*F16K 17/04* (2006.01)
*F16K 31/122* (2006.01)
(Continued)

(52) U.S. Cl.
CPC .............. *F16K 17/044* (2013.01); *F16K 1/00* (2013.01); *F16K 1/32* (2013.01); *F16K 31/122* (2013.01);
(Continued)

(58) Field of Classification Search
CPC .. F16K 17/044; F16K 31/1221; F16K 31/122; F16K 1/523; F16K 1/32;
(Continued)

(56) References Cited

U.S. PATENT DOCUMENTS 462,823 A * 11/1891 Phillipson ............. F16K 31/122
251/63
958,716 A * 5/1910 Bard ..................... E04B 1/2403
251/77
(Continued)

FOREIGN PATENT DOCUMENTS

CA        1 231 618        1/1988
DE     196 46 234 C1      7/1997
(Continued)

OTHER PUBLICATIONS

International Search Report dated Oct. 6, 2015 in PCT/JP2015/069020 filed on Jul. 1, 2015 (with English translation).
(Continued)

*Primary Examiner* — Craig J Price
*Assistant Examiner* — Andrew J Rost
(74) *Attorney, Agent, or Firm* — Oblon, McClelland, Maier & Neustadt, L.L.P.

(57) ABSTRACT

Provided is a pneumatic valve in which a seal member; a shaft provided with a valve body capable of abutting against the seal member; and a valve-actuating pressure chamber that moves the shaft in an axial direction to actuate the valve body is provided within a valve casing. The shaft has a first member that receives pressure from the valve-actuating pressure chamber, and a second member that includes the valve body and is movable relative to the first member in the axial direction. The pneumatic valve further has a stopper that is provided in a movement path of the first member, and a disc spring that is sandwiched between the first member and the second member, has elastic energy accumulated therein in a state where the first member is in contact with the stopper, and presses the valve body against the seal member.

8 Claims, 4 Drawing Sheets

(51) Int. Cl.
*F16K 1/00* (2006.01)
*F16K 1/32* (2006.01)

(52) U.S. Cl.
CPC ...... *F16K 31/1221* (2013.01); *F16K 31/1225* (2013.01)

(58) Field of Classification Search
CPC . F16K 1/52; F16K 1/126; F16K 15/18; F16K 31/1225
USPC ............................ 251/62, 63.4, 63.5, 284, 77
See application file for complete search history.

(56) References Cited

U.S. PATENT DOCUMENTS

| | | | | |
|---|---|---|---|---|
| 3,211,418 | A | * | 10/1965 | Klinger-Lohr ............ F16K 1/36 251/176 |
| 3,923,282 | A | * | 12/1975 | Henzler .................. F16K 41/10 251/63.4 |
| 4,601,457 | A | | 7/1986 | Austin et al. |
| 4,699,355 | A | * | 10/1987 | Tomlin ................ E21B 33/0355 251/62 |
| 7,143,956 | B2 | * | 12/2006 | Fukano ................... F16K 23/00 222/571 |
| 7,963,502 | B2 | * | 6/2011 | Lovell ..................... F16K 41/02 251/214 |
| 8,678,342 | B2 | * | 3/2014 | Sakai .................. F16K 31/1225 251/186 |
| 9,677,679 | B2 | * | 6/2017 | Danzy .................... F16K 25/00 |
| 2008/0047616 | A1 | | 2/2008 | Lovell et al. |
| 2009/0121168 | A1 | | 5/2009 | Muzzo et al. |
| 2012/0119129 | A1 | | 5/2012 | Sakai et al. |

FOREIGN PATENT DOCUMENTS

| | | |
|---|---|---|
| DE | 102 37 236 B3 | 2/2004 |
| EP | 0 545 846 A1 | 6/1993 |
| JP | 52-151930 | 12/1977 |
| JP | 59-101074 U | 7/1984 |
| JP | 60-175886 | 9/1985 |
| JP | 5-288285 | 11/1993 |
| JP | 6-94140 | 4/1994 |
| JP | 9-112736 | 5/1997 |
| JP | 09-256916 A | 9/1997 |
| JP | 11-200959 A | 7/1999 |
| JP | 2004-301318 | 10/2004 |
| JP | 2006-292266 A | 10/2006 |
| JP | 2008-286339 | 11/2008 |
| JP | 2009-216105 | 9/2009 |
| JP | 2009-535588 | 10/2009 |

OTHER PUBLICATIONS

Written Opinion dated Oct. 6, 2015 in PCT/JP2015/069020 filed on Jul. 1, 2015.

* cited by examiner

PNEUMATIC VALVE

CROSS-REFERENCE TO RELATED APPLICATION

This application is a Continuation Application based on PCT Patent Application No. PCT/JP2015/069020, filed on Jul. 1, 2015, whose priority is claimed on Japanese Patent Application No. 2014-203873, filed on Oct. 2, 2014. The contents of both the PCT Patent Application and the Japanese Patent Application are incorporated herein by reference.

TECHNICAL FIELD

The present disclosure relates to a pneumatic valve.

BACKGROUND ART

The following Patent Document 1 discloses a pneumatic valve for a rocket engine used in space development. In such a pneumatic valve, typically, the flow of a fluid (for example, a propellant) that flows in from an inlet pipe is controlled by opening and closing of a poppet that is a valve body.

In a closed state, the poppet is sealed by being pressed against a seat surface with a specified axial force by a spring built into a valve casing, and thereby leakage of the fluid to a downstream side is prevented. On the other hand, in an open state, an actuating gas is supplied to a pressure chamber within the valve casing with a specified pressure, and a diaphragm is pushed up, and thereby, the poppet is separated from the seat surface and the fluid flows to the downstream side.

CITATION LIST

Patent Document

[Patent Document 1] Japanese Unexamined Patent Application, First Publication No. 2004-301318

SUMMARY

Technical Problem

In the related-art pneumatic valve, the valve body is pressed against the seal member and is brought into a closed state. However, a pressing force of the valve body against the seal member may become excessive depending on operating conditions, environmental conditions, manufacturing errors, or the like.

If the pressing force against the seal member becomes excessive, there are problems in that creep (strain) occurs and the amount of leakage of the valve becomes excessive. Additionally, since resin is often used for the seal member, and a creep limit varies depending on environmental conditions, it is necessary to strictly control a sealing force (pressing force of the valve body).

The disclosure has been made in view of the above problems, and an object thereof is to provide a pneumatic valve in which a pressing force of a valve body against a seal member can be managed appropriately and occurrence of creep can be suppressed.

Solution to Problem

In order to solve the above problems, a first aspect related to the disclosure provides a pneumatic valve has provided within a valve casing a seal member; a shaft provided with a valve body capable of abutting against the seal member; and a valve-actuating pressure chamber that moves the shaft in an axial direction to actuate the valve body. The shaft includes a first member that receives pressure from the valve-actuating pressure chamber, and a second member that includes the valve body and is movable relative to the first member in the axial direction. The pneumatic valve further includes a stopper that is provided in a movement path of the first member, and a biasing member that is sandwiched between the first member and the second member, has an elastic energy accumulated therein in a state where the first member is in contact with the stopper, and presses the valve body against the seal member.

In the disclosure, by splitting the shaft into the first member and the second member, sandwiching the biasing member between the first member and the second member, and providing the stopper in the movement path of the first member, the pressing force of the valve body of the second member against the seal member can be controlled separately from the force that acts on the first member.

According to the disclosure, the pneumatic valve in which the pressing force of the valve body against the seal member is managed appropriately and occurrence of creep can be suppressed is obtained.

DESCRIPTION OF EMBODIMENTS

Hereinafter, a pneumatic valve related to the disclosure will be described with reference to the drawings. In addition, in the following drawings, scales of respective members are appropriately changed in order to make respective members have recognizable sizes. Additionally, in the following embodiments a pneumatic valve for a rocket engine will be illustrated and described.

Figure 1:
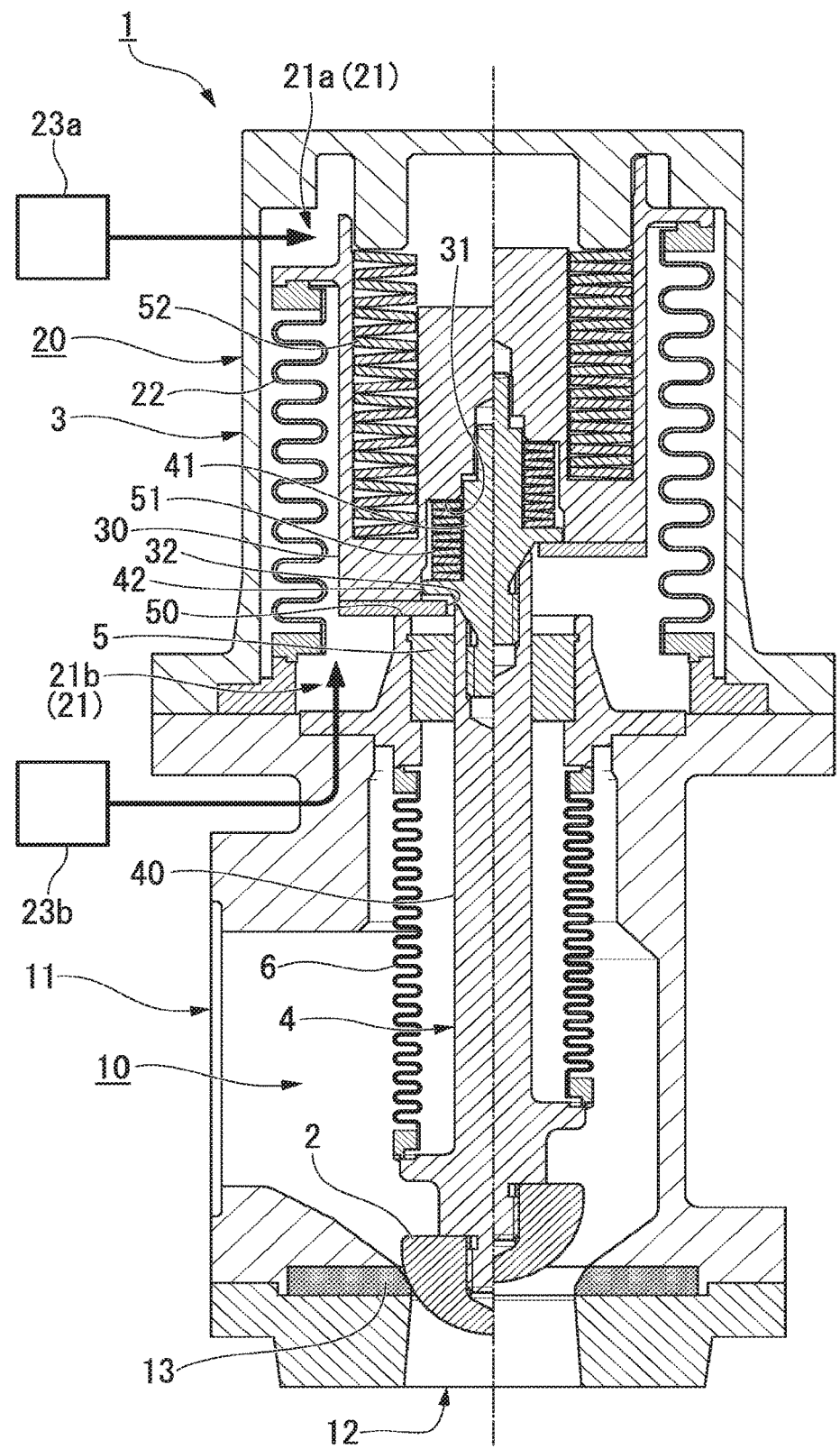
FIG. 1 is a configuration view of a pneumatic valve in an embodiment of the disclosure.

FIG. 1 is a configuration view of a pneumatic valve 1 in an embodiment of the disclosure. In addition, a left half of FIG. 1 illustrates a closed state of the pneumatic valve 1, and a right half of FIG. 1 illustrates an open state of the pneumatic valve 1.

The pneumatic valve 1 of the present embodiment is a propellant valve for a rocket engine, and controls the flow of a fluid that is a propellant (an oxidizer/fuel). The pneumatic valve 1 has a flow passage part 10 in which a valve body 2 that controls the flow of the fluid is disposed, an actuator part 20 that actuates the valve body 2.

The flow passage part 10 is provided inside a valve casing 3. The fluid flows into the flow passage part 10 from a flow passage inlet 11 and flows out of a flow passage outlet 12.

The flow passage outlet 12 is provided with a seal member 13. The seal member 13 is a main seal, and has the valve body 2 pressed thereagainst. In the present embodiment, the valve body 2 is metal, and the seal member 13 is made of resin. For example, resin, such as polychlorotrifluoroethylene (PCTFE), can be used for the seal member 13.

The actuator part 20 is provided inside the valve casing 3. The actuator part 20 has a valve-actuating pressure chamber 21 that moves a shaft 4 in an axial direction to actuate the valve body 2. The valve-actuating pressure chamber 21 is divided into a closing actuating pressure chamber 21a and an opening actuating pressure chamber 21b via an extensible partition wall 22, such as bellows. A closing actuating gas is supplied from an actuating gas supply device 23 a to the closing actuating pressure chamber 21a. Additionally, an opening actuating gas is supplied from an actuating gas supply device 23b to the opening actuating pressure chamber 21b.

If the actuating gas is supplied to the closing actuating pressure chamber 21a, the internal pressure of the closing actuating pressure chamber 21a is raised, and the shaft 4 is pushed down in the axial direction. As a result, the valve body 2 is in contact with the seal member 13, the flow passage outlet 12 is liquid-tightly sealed, and leakage of the fluid to a downstream side is prevented.

On the other hand, if the actuating gas is supplied to the opening actuating pressure chamber 21b, the internal pressure of the opening actuating pressure chamber 21b is raised, and the shaft 4 is pushed up in the axial direction. Accordingly, the valve body 2 is separated from the seal member 13, and the fluid flows from the flow passage outlet 12 to the downstream side.

The shaft 4 includes a first member 30 that receives pressure from the valve-actuating pressure chamber 21, and a second member 40 that has the valve body 2, and is movable in the axial direction relative to the first member 30.

The first member 30 has an accommodating groove 31 that accommodates an upper end (accommodated part 41) of the second member 40, and a detent part 32 that locks the second member 40 in the axial direction. Meanwhile, the second member 40 has a valve body 2 at a lower end thereof, and has the accommodated part 41 at an upper end thereof.

The accommodating groove 31 is formed to be slightly greater than the accommodated part 41 of the second member 40, and is movable relative to the second member 40 in the axial direction. The detent part 32 is integrally attached to an edge of a lower opening of the accommodating groove 31. The detent part 32 is formed in a plate shape with a predetermined thickness, and protrudes further inward than the edge of the lower opening of the accommodating groove 31. The shape of the detent part 32 may be a ring shape that is disposed along the lower opening of the accommodating groove 31, or a rectangular shape in which a plurality of the detent parts are disposed at intervals in a circumferential direction of the lower opening.

The accommodated part 41 of the second member 40 has a flange part 42 locked to the detent part 32. The flange part 42 protrudes in a ring shape in the radial direction with a predetermined thickness, and is formed to be slightly smaller than the lower opening of the accommodating groove 31. A lower surface of this flange part 42 faces, in the axial direction, an upper surface of the detent part 32 that protrudes further inward than the edge of the lower opening of the accommodating groove 31. Meanwhile, an upper surface of the flange part 42 faces the accommodating groove 31 in the axial direction. The movement distance (the amount of protrusion) with respect to the second member 40 relative to the first member 30 is limited to a certain range by the lower surface of the flange part 42 being locked to the upper surface of the detent part 32.

Meanwhile, a movement path of the first member 30 is provided with a stopper 50. The stopper 50 faces the lower surface of the detent part 32 of the first member 30 in the axial direction. The movement distance of the first member 30 relative to the valve casing 3 is limited to a certain range by the lower surface of the detent part 32 being locked to the stopper 50. The stopper 50 of the present embodiment is provided inside the valve-actuating pressure chamber 21, and the movement of the first member 30 in the axial direction is limited to the inside of the valve-actuating pressure chamber 21. The stopper 50 supports a shaft seal 5 and is also connected to an extensible partition wall 6, such as bellows, which extensibly supports the second member 40 that protrudes to the flow passage part 10.

The pneumatic valve 1 has a disc spring 51 (biasing member) that is sandwiched between the first member 30 and the second member 40, has elastic energy accumulated therein in a state where the first member 30 is in contact with the stopper 50, and presses the valve body 2 against the seal member 13. The disc spring 51 is disposed between the accommodating groove 31 of the first member 30 and the flange part 42 of the second member 40. The disc spring 51 determines a pressing force (sealing force) of the valve body 2 against the seal member 13. The pressing force of the valve body 2 can be managed by a biasing force (repulsive force) of the disc spring 51 in a state where the first member 30 is in contact with the stopper 50.

Additionally, the pneumatic valve 1 has a disc spring 52 (second biasing member) that biases the first member 30 against the stopper 50. The disc spring 52 is disposed between the valve casing 3 and the first member 30. The disc spring 52 assists in the movement (closing actuation) of the first member 30 that receives pressure from the closing actuating pressure chamber 21a. The disc spring 52 is formed to have a greater internal diameter than the external diameter of the disc spring 51, and the disc spring 51 is disposed inside the disc spring 52.

Subsequently, the operation of the pneumatic valve 1 having the above configuration will be described with reference to schematic views illustrated in FIGS. 2A, 2B, and 3.

Figure 2A:
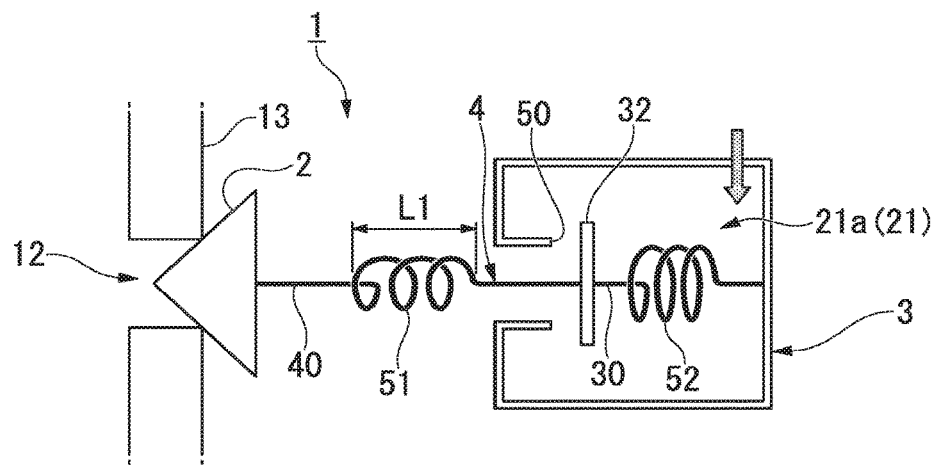
FIG. 2A is a schematic view illustrating the operation of the pneumatic valve in the embodiment of the disclosure when an actuating gas is supplied to a closing actuating pressure chamber.
Figure 2B:
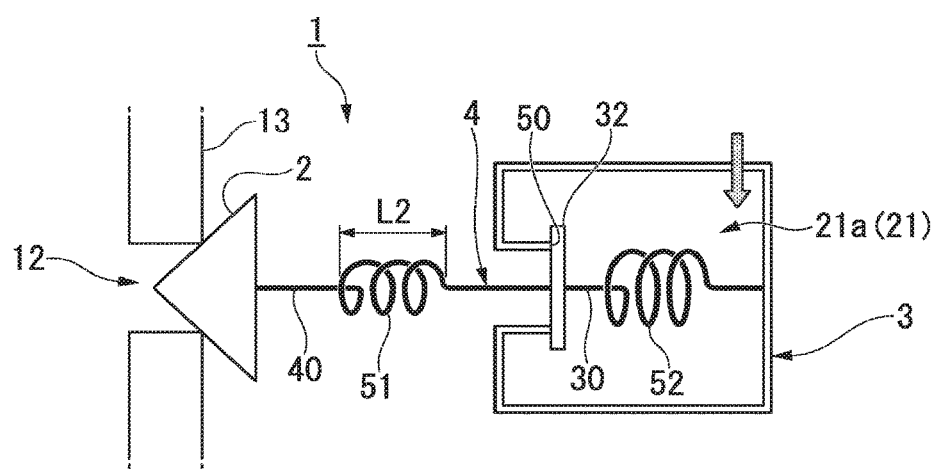
FIG. 2B is a schematic view illustrating the operation of the pneumatic valve when the internal pressure of the closing actuating pressure chamber in the embodiment of the disclosure is further raised.

FIG. 2A and 2B are schematic views illustrating the operation when the pneumatic valve 1 in the embodiment of the disclosure is actuated for closing. FIG. 3 is a schematic view illustrating the operation when the pneumatic valve 1 in the embodiment of the disclosure is kept.

As illustrated in FIG. 2A, in the pneumatic valve 1, if the actuating gas is supplied to the closing actuating pressure chamber 21a, the overall shaft 4 moves in the axial direction, and the valve body 2 is in contact with the seal member 13. When the valve body 2 is in contact with the seal member 13, as illustrated in FIG. 2A, the first member 30 (detent part 32) is not locked to the stopper 50. That is, the valve body 2 is in contact with the seal member 13 immediately before the first member 30 is locked to the stopper 50. In this case, the disc spring 51 has a length L1.

If the internal pressure of the closing actuating pressure chamber 21 a further increases, as illustrated in FIG. 2B, the first member 30 (detent part 32) moves in the axial direction until the first member is locked to the stopper 50. Meanwhile, since the valve body 2 is in contact with the seal member 13, there is almost no axial movement of the second member 40. As a result, a gap between the first member 30 and the second member 40 becomes narrow, a compressive force is exerted on the disc spring 51 sandwiched between both of the members. In this case, the disc spring 51 has a length L2 and has a relationship of L1>L2.

If the first member 30 is in contact with the stopper 50, a force received from the closing actuating pressure chamber 21a and the disc spring 52 is offset by the reaction force (action or reaction) of the stopper 50, and only the biasing force (repulsive force) of the disc spring 51 acts on the seal member 13. For this reason, the pressing force of the valve body 2 against the seal member 13 can be controlled only with the amount of compression of the disc spring 51, separately from the force that acts on the first member 30. Management of the pressing force of the valve body 2 can be easily and accurately controlled by previous acquisition of the spring constant of the disc spring 51, and seam adjustment (the amount adjustment of compression) of the disc spring 51 resulting from sandwiching a thin plate.

In this way, in the pneumatic valve 1 of the present embodiment, the shaft 4 is split into the first member 30 and the second member 40, the disc spring 51 is sandwiched in the middle of a force transmission part, and the stopper 50 is provided in the movement path of the first member 30. Therefore, the pressing force of the valve body 2 against the seal member 13 can be controlled separately from the force that acts on the first member 30, and it is possible to appropriately manage the pressing force of the valve body 2 against the seal member 13, irrespective of the fluctuation errors of actuating pressure or the manufacturing errors of the actuator part 20 (disc spring 52 or the like). For this reason, the pressing force of the valve body 2 against the seal member 13 can be stabilized, occurrence of creep can be suppressed, and leakage of a fluid can be suppressed.

In addition, if the actuating gas is supplied to the opening actuating pressure chamber 2 lb illustrated in FIG. 1 when the pneumatic valve 1 is actuated for opening, and the first member 30 is separated from the stopper 50, compression of the disc spring 51 is released. If the internal pressure of the opening actuating pressure chamber 21b further increased, as illustrated on the right side of FIG. 1, the detent part 32 will be caught in the second member 40, the valve body 2 is separated from the seal member 13, and the overall shaft 4 is lifted, which results in an open state.

Figure 3:
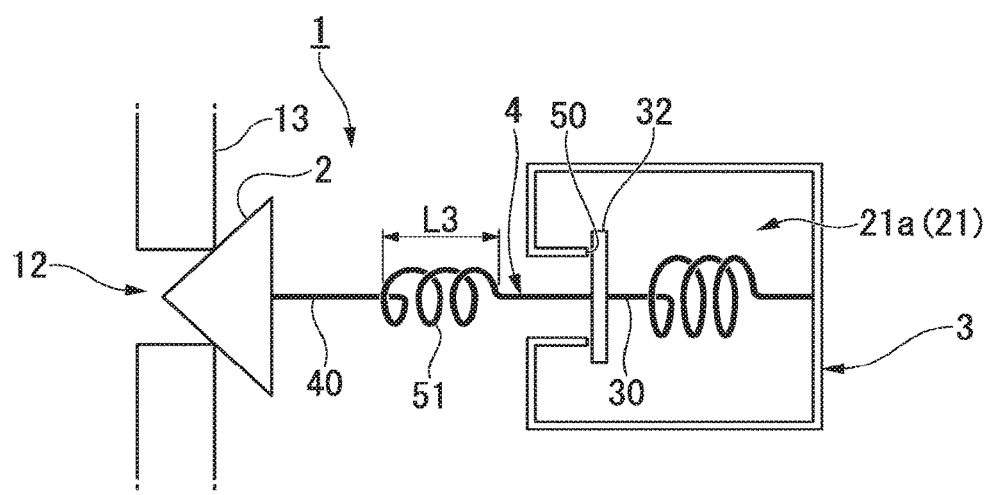
FIG. 3 is a schematic view illustrating the operation when the pneumatic valve in the embodiment of the disclosure is kept.

Meanwhile, as illustrated in FIG. 3, when the pneumatic valve 1 is kept, the valve-actuating pressure chamber 21 is brought into an unloaded state. However, by providing the disc spring 52 that perform assist at the time of closing actuation, the first member 30 can be biased toward the stopper 50 even in an unloaded state. According to this configuration, the valve body 2 is brought into contact with the seal member 13 when the pneumatic valve 1 is kept so that internal components can be prevented from moving. In this case, a contact state between the valve body 2 and the seal member 13 becomes a soft touch state, and the pressing force of the valve body 2 is adjusted minutely.

In this case, the first member 30 is in a state immediately before the first member is in contact with the stopper 50 as illustrated in FIG. 3. Additionally, the disc spring 51 has a length L3, and has a relationship of L1>L3>L2. That is, the disc spring 51 at the time of keeping has the amount of compression between FIG. 2A and FIG. 2B, and the pressing force of the valve body 2 against the seal member 13 becomes smaller than that at the time of use. In this way, by bringing the valve body 2 into contact with the seal member 13 to prevent rocking of the shaft 4 at the time of keeping, fatigue of the valve body 2 and the seal member 13 resulting from repetitive stress can be suppressed, and the amount of leakage of the valve can be prevented from becoming excessive.

Additionally, in the present embodiment, the pressing force of the valve body 2 against the seal member 13 is managed using the disc spring 51. However, according to this configuration, as compared to a coil spring, a large load can be added with a small space and a small amount of deflection. Therefore, the pneumatic valve 1 can be reduced in size and weight. Additionally, as illustrated in FIG. 1, if the disc spring 51 is disposed so as to be received inside the disc spring 52, the pneumatic valve 1 can be further reduced in size.

In this way, according to the above-described present embodiment, there is provided the pneumatic valve 1 in which the seal member 13, the shaft 4 including the valve body 2 capable of abutting against the seal member 13, and the valve-actuating pressure chamber 21 that moves the shaft 4 in the axial direction to actuate the valve body 2 are provided inside the valve casing 3. The shaft 4 has the first member 30 that receives pressure from the valve-actuating pressure chamber 21, and the second member 40 that includes the valve body 2 and is movable relative to the first member 30 in the axial direction. The pneumatic valve 1 further has the stopper 50 that is provided in the movement path of the first member 30, and the disc spring 51 that is sandwiched between the first member 30 and the second member 40, has elastic energy accumulated therein in a state where the first member 30 is in contact with the stopper 50, and presses the valve body 2 against the seal member 13. Accordingly, the pressing force of the valve body 2 against the seal member 13 can be managed appropriately, and occurrence of creep can be suppressed.

Although the preferred embodiment of the disclosure has been described above referring to the drawings, the disclosure is not limited to the above-described embodiment. Various shapes or combinations of the respective constituent members that arc illustrated in the above-described embodiment, arc examples, and can be variously changed on the basis of design requirements or the like without departing from the spirit of the disclosure.

Figure 4:
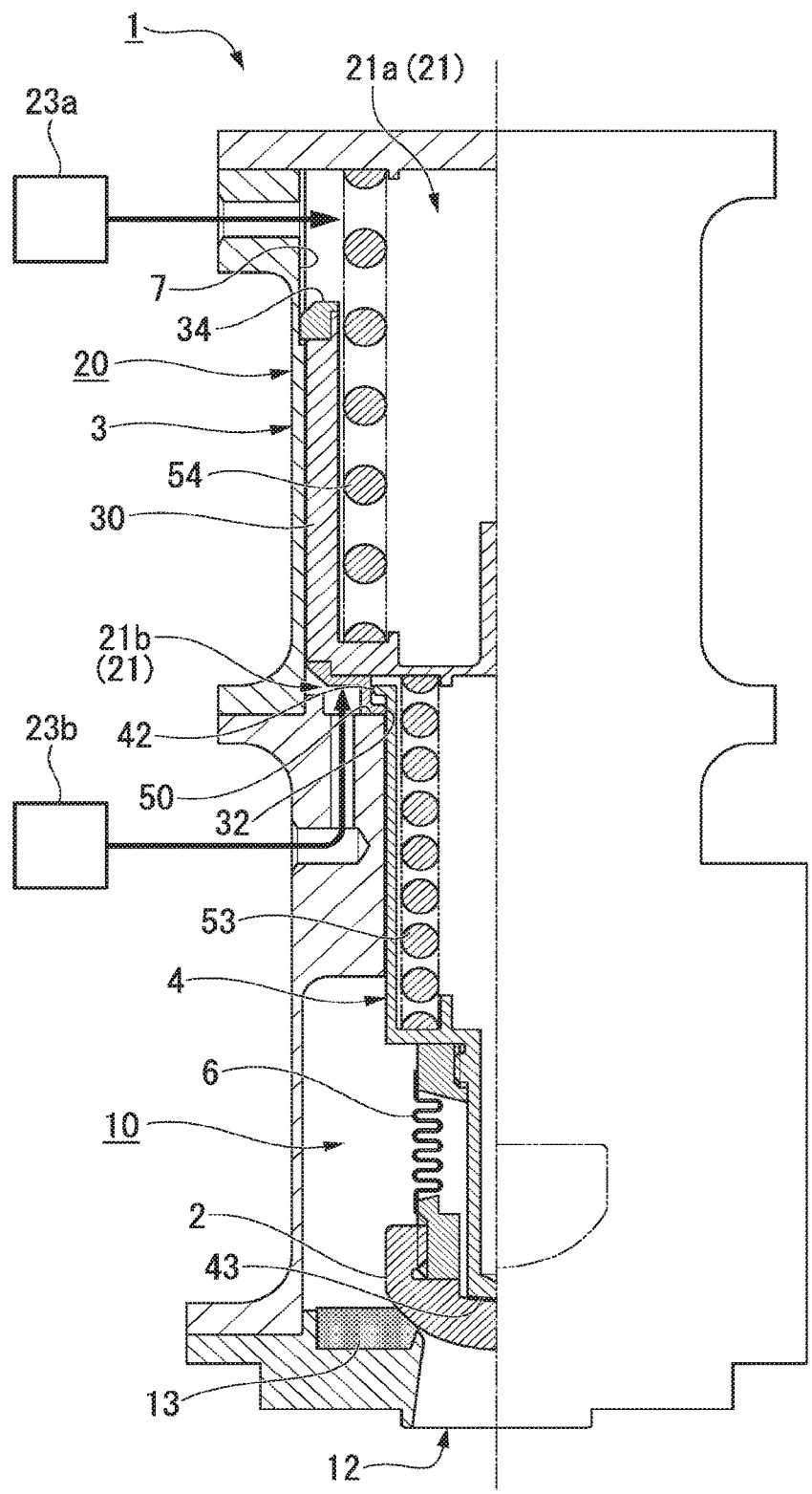
FIG. 4 is a configuration view of a pneumatic valve in another embodiment of the disclosure.

For example, the disclosure has a configuration as illustrated in FIG. 4.

FIG. 4 is a configuration view of a pneumatic valve 1 in a separate embodiment of the disclosure. In addition, in FIG. 4, the constituent members that are the same or similar to those of the above-described embodiment will be designated by same reference signs, and the description thereof will be simplified or omitted.

In the separate embodiment illustrated in FIG. 4, the first member 30 is formed in a substantially tubular shape. The first member 30 has a sliding piece 34 at an outer peripheral part thereof, and is movably engaged with a sliding groove 7 formed in the valve casing 3 so as to be movable in the axial direction. The inside of the first member 30 serves as the closing actuating pressure chamber 21a, and the coil spring 54 (second biasing member) that assists in movement at the time of closing actuation is disposed inside the first chamber. The detent part 32 is attached to a lower end of the first member 30.

The detent part 32 faces the stopper 50, which is provided in the valve casing 3, in the axial direction. The detent part 32 has a shape that can guarantee the opening actuating pressure chamber 21b between the first member 30 and the valve casing 3, in a state where the detent part 32 is in contact with the stopper 50. Meanwhile, a flange part 42 is provided at an upper end of the second member 40 and faces the detent part 32 in the axial direction. The second member 40 is also formed in a substantially tubular shape, and a coil spring 53 (biasing member) that adjusts the pressing force of the valve body 2 is disposed inside the second member. In addition, the valve body 2 is supported by the extensible partition wall 6, and a pressing part 43 that presses the valve body 2 against the seal member 13 is provided at a lower end of the second member 40. According to the above configuration, the shaft 4 is split into the first member 30 and the second member 40, the coil spring 53 is sandwiched in the middle of the force transmission part, and the stopper 50 is provided in the movement path of the first member 30. Therefore, the pressing force of the valve body 2 against the seal member 13 can be controlled separately from the force that acts on the first member 30, and it is possible to appropriately manage the pressing force of the valve body 2 against the seal member 13. For this reason, similar to the above-described embodiment, the pressing force of the valve body 2 against the seal member 13 can be stabilized, occurrence of creep can be suppressed, and leakage of a fluid can be suppressed.

In addition, for example, a configuration in which the disc spring or the coil spring is used has been illustrated in the above embodiment. However, arbitrary means that generates a biasing force, such as other various kinds of springs and bellows, can be used. Additionally, the pneumatic valve 1 can be reduced in size and weight similar to the disc spring by using the coil spring or bellows as the biasing member.

In addition, as the biasing means, the bellows, the coil spring, and the disc spring are preferable in this order, and the disc spring is most preferable.

INDUSTRIAL APPLICABILITY

According to the disclosure, the pneumatic valve in which the pressing force of the valve body against the seal member can be managed appropriately and occurrence of creep can be suppressed is obtained.

What is claimed is:
1. A pneumatic valve comprising:
a valve casing;
a seal member provided within the valve casing;
a shaft provided with a valve body capable of abutting against the seal member; and
a valve-actuating pressure chamber that moves the shaft in an axial direction to actuate the valve body,
wherein the shaft includes a first member that receives pressure from the valve-actuating pressure chamber, and a second member that includes the valve body and is movable relative to the first member in the axial direction, and
wherein the pneumatic valve further comprises:
a stopper that is provided in a movement path of the first member, and
a biasing member that is sandwiched between the first member and the second member, has an elastic energy accumulated therein in a state where the first member is in contact with the stopper, and presses the valve body against the seal member,
wherein the first member is locked to the stopper after the valve body is in contact with the seal member, and
wherein a first length of the biasing member in the axial direction when the valve body is in contact with the seal member and the first member is not locked to the stopper is longer than a second length of the biasing member in the axial direction when the valve body is in contact with the seal member and the first member is locked to the stopper.
2. The pneumatic valve according to claim 1, further comprising:
a second biasing member that biases the first member against the stopper.
3. The pneumatic valve according to claim 2,
wherein the biasing member is a disc spring.
4. The pneumatic valve according to claim 3,
wherein the second biasing member is a disc spring with a diameter greater than a diameter of the biasing member.
5. The pneumatic valve according to claim 1,
wherein the biasing member is a disc spring.
6. The pneumatic valve according to claim 1,
wherein the valve-actuating pressure chamber including a closing actuating pressure chamber and an opening actuating pressure chamber, and
wherein the stopper being provided inside the valve-actuating pressure chamber and delimiting a portion of the opening actuating pressure chamber such that movement of the first member is limited to an inside of the valve-actuating pressure chamber.
7. The pneumatic valve according to claim 6,
wherein the first member includes a sliding piece at an outer peripheral part thereof which is movably engaged with a sliding groove formed in the valve casing so as to be movable in the axial direction,
wherein an inside of the first member defines the closing actuating pressure chamber and the second biasing member is disposed inside the closing actuating pressure chamber, and
wherein the biasing member is disposed inside the second member.
8. The pneumatic valve according to claim 1,
wherein the first member includes an accommodating groove that an upper end of the second member, and a detent part that locks the second member in the axial direction and that is attached an edge of a lower opening of the accommodating groove,
wherein the upper end of the second member includes a flange part, and
wherein the biasing member is disposed between the accommodating groove of the first member and the flange part of the second member.

* * * * *